UNITED STATES PATENT OFFICE.

AUGUSTE MARTIGNIER, OF MONTPELLIER, FRANCE.

PROCESS OF OBTAINING CREAM OF TARTAR.

SPECIFICATION forming part of Letters Patent No. 439,805, dated November 4, 1890.

Application filed July 26, 1890. Serial No. 360,094. (No specimens.) Patented in France November 23, 1889, No. 202,138; in England December 15, 1889, No. 20,078; in Spain February 8, 1890, No. 10,268, and in Austria-Hungary April 18, 1890, No. 73,434.

*To all whom it may concern:*

Be it known that I, AUGUSTE MARTIGNIER, of Montpellier, (Hérault,) in the Republic of France, have invented a certain new and useful process for the extraction of the tartrate of lime contained in lyes, argols, tartars, and other tartarous matters, and its transformation into cream of tartar or into tartaric acid, (for which I have received patent in France, No. 202,138, dated November 23, 1889; in England, No. 20,078, dated December 15, 1889; in Spain, No. 10,268, dated February 8, 1890, and in Austria-Hungary, No. 73,434, dated April 18, 1890,) of which the following is a specification.

When a more or less diluted solution of neutral tartrate of potash is put in presence of hydrated sulphate of lime, tartrate of lime is formed, which precipitates, and also sulphate of potash, which remains dissolved.

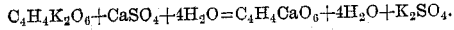

$$C_4H_4K_2O_6 + CaSO_4 + 4H_2O = C_4H_4CaO_6 + 4H_2O + K_2SO_4.$$

This reaction is known and used in some works to transform tartar into tartrate of lime.

When on the contrary tartrate of lime is added to a saturated solution of sulphate of potash, there is formed neutral tartrate of potash and sulphate of lime according to the following equation:

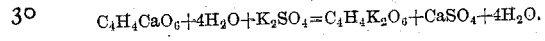

$$C_4H_4CaO_6 + 4H_2O + K_2SO_4 = C_4H_4K_2O_6 + CaSO_4 + 4H_2O.$$

This reaction is complete. It may be effected cold or more rapidly with heat or under pressure, provided, however, that there is excess of sulphate of potash. My improved process is based upon this reaction.

The lyes or other tartarous matters finely pulverized are treated with a saturated solution of sulphate of potash. This treatment may take place cold, under ebullition or under pressure, accordingly as the material to be treated is more or less considerable, operating with heat being more rapid, but giving more colored liquids than cold operation. If the lye contains bitartrate of potash it must first be neutralized with chalk. The reaction being terminated, the residuum containing the sulphate of lime and the insoluble matters is separated from the liquid containing the neutral tartrate of potash and the excess of sulphate of potash. This separation may be effected by decantation, by the filter-press, or other suitable means. The liquid is then decolorized by animal charcoal and treated with an equivalent quantity of sulphuric acid, which, in precipitating nearly the whole of the bitartrate of potash, regenerates the half of the sulphate of potash entered into reaction. The cream of tartar thus precipitated is purified by known means.

For the manufacture of tartaric acid the cream is transformed into tartrate of lime, also by known means. The tartrate of lime may also be precipitated directly from the initial liquid suitably diluted by adding thereto hydrated sulphate of lime. I may also, when it may be done with advantage, replace the sulphate of potash by sulphate of soda. I then proceed in the following manner: The lyes, tartars, &c., finely pulverized and saturated, if that is necessary, with chalk, are treated with a saturated solution of sulphate of soda. The tartrate of lime is then transformed into sulphate of lime, which remains with the insoluble substance of the lye. The neutral tartrate of soda and the excess of sulphate of soda are found in the solution. The separation of the liquid and the residuum is effected by the means above set forth.

The liquid, decolorized by bone-black, is treated with an equivalent quantity of sulphuric acid and of a potassic salt, preferably sulphate of potash. Nearly the whole of the tartaric acid is precipitated in the form of bitartrate of potash. This bitartrate is purified by known means, or, according to circumstances, it is transformed into tartaric acid. I may also precipitate directly from the tartrate of lime by adding hydrated sulphate of lime to the initial solution containing the neutral tartrate of soda. The tartrate of lime is transformed into tartaric acid by known means. I may also treat the lyes or tartars with a solution containing a judicious mixture of sulphate of soda and sulphate of potash. There is then formed neutral tartrate of potash, the sulphate of soda assisting the reaction. In this case sulphuric acid alone is necessary to precipitate the bitartrate of potash.

Having fully described my invention, what I claim, and desire to secure by Letters Patent, is—

1. The process of obtaining cream of tartar from tartarous compounds contained in lyes, argols, tartars, and other tartarous matters by treating them with an alkaline sulphate, separating the residuum from the liquid, and precipitating the cream of tartar from the latter.

2. The process of obtaining cream of tartar or tartaric acid from tartarous compounds contained in lyes, argols, tartars, and other tartarous matters by treating them with sulphate of potash or of sulphate of soda, or by a mixture of the two, separating the residuum from the liquid, and then precipitating from the latter the cream of tartar by the aid of sulphuric acid, all substantially as described.

3. The process of obtaining cream of tartar from tartarous compounds contained in lyes, argols, tartars, and other tartarous matters by treating them first with sulphate of potash to obtain neutral tartrate of potash, and then treating this and the excess of sulphate with sulphuric acid to precipitate the cream of tartar, all substantially as described.

In testimony whereof I have signed my name to this specification in the presence of two subscribing witnesses.

AUGUSTE MARTIGNIER.

Witnesses:
ERB. QUAÉ,
A. SEMANOT.